(12) United States Patent
Parker

(10) Patent No.: US 8,251,662 B2
(45) Date of Patent: Aug. 28, 2012

(54) WIND TURBINE BLADE ASSEMBLY AND APPARATUS

(76) Inventor: Daniel B. Parker, Deering, NH (US)

( * ) Notice: Subject to any disclaimer, the term of this patent is extended or adjusted under 35 U.S.C. 154(b) by 1255 days.

(21) Appl. No.: 12/017,728

(22) Filed: Jan. 22, 2008

(65) Prior Publication Data

US 2010/0278650 A1 Nov. 4, 2010

Related U.S. Application Data

(60) Provisional application No. 60/934,450, filed on Jun. 13, 2007, provisional application No. 60/881,748, filed on Jan. 22, 2007.

(51) Int. Cl.
*F03D 7/02* (2006.01)

(52) U.S. Cl. ...... 416/176; 416/9; 416/201 A; 416/210 R

(58) Field of Classification Search ............ 415/4.3, 415/4.5, 72, 908; 416/176, 201 A, 201 R, 416/210 R See application file for complete search history.

(56) References Cited

U.S. PATENT DOCUMENTS

| | | | |
|---|---|---|---|
| 893,052 A * | 7/1908 | Carlson | 416/13 |
| 1,002,833 A | 9/1911 | Giddings | |
| 1,504,259 A * | 8/1924 | Miller | 416/194 |
| 1,729,362 A * | 9/1929 | Ruthven | 416/13 |
| 4,086,026 A * | 4/1978 | Tamanini | 416/176 |
| 4,217,501 A * | 8/1980 | Allison | 290/55 |
| 4,218,175 A | 8/1980 | Carpenter | |
| 4,293,274 A | 10/1981 | Gilman | |
| 4,427,343 A | 1/1984 | Fosdick | |
| 4,500,259 A * | 2/1985 | Schumacher | 416/122 |
| 4,545,728 A * | 10/1985 | Cheney, Jr. | 416/11 |
| 4,708,592 A | 11/1987 | Krolick et al. | |
| 4,718,821 A | 1/1988 | Clancy | |
| 4,850,798 A | 7/1989 | Bailey | |
| 5,075,964 A | 12/1991 | Galliet | |
| 5,405,246 A | 4/1995 | Goldberg | |
| 5,669,758 A | 9/1997 | Williamson | |
| 5,890,875 A | 4/1999 | Silvano | |
| 5,910,688 A | 6/1999 | Li | |
| 5,961,289 A | 10/1999 | Lohmann | |
| 6,428,275 B1 | 8/2002 | Jaakkola | |

(Continued)

FOREIGN PATENT DOCUMENTS

JP 63057874 A * 3/1988

(Continued)

OTHER PUBLICATIONS

Written Opinion of the International Searching Authority and International Search Report dated Mar. 31, 2009, received in PCT/US2008/088186.

*Primary Examiner* — Edward Look
*Assistant Examiner* — Andrew C Knopp
(74) *Attorney, Agent, or Firm* — McLane, Graf, Raulerson & Middleton, Professional Association

(57) ABSTRACT

In one aspect, a wind turbine blade assembly includes a central shaft defining an axis of rotation and a plurality of helically twisted blades supported on the central shaft. The helically twisted blades have an inner edge and an outer edge, and at least a portion of the helically twisted blades is radially spaced apart from the central shaft. In another aspect, a wind turbine apparatus employing the wind turbine blade assembly is provided.

20 Claims, 17 Drawing Sheets

U.S. PATENT DOCUMENTS

| | | |
|---|---|---|
| 6,452,287 B1 | 9/2002 | Looker |
| 6,616,402 B2 | 9/2003 | Selsam |
| 6,692,230 B2 * | 2/2004 | Selsam .................... 416/132 B |
| 6,948,910 B2 | 9/2005 | Polacsek |
| 7,132,760 B2 | 11/2006 | Becker |
| 2006/0032361 A1 * | 2/2006 | Deschamps et al. ............ 84/600 |
| 2006/0257240 A1 | 11/2006 | Naskali et al. |
| 2006/0257241 A1 | 11/2006 | Eielsen |
| 2007/0018464 A1 | 1/2007 | Becker |

FOREIGN PATENT DOCUMENTS

| | | |
|---|---|---|
| WO | WO02/02935 A1 | 1/2002 |
| WO | WO2009/094092 A1 | 7/2009 |

* cited by examiner

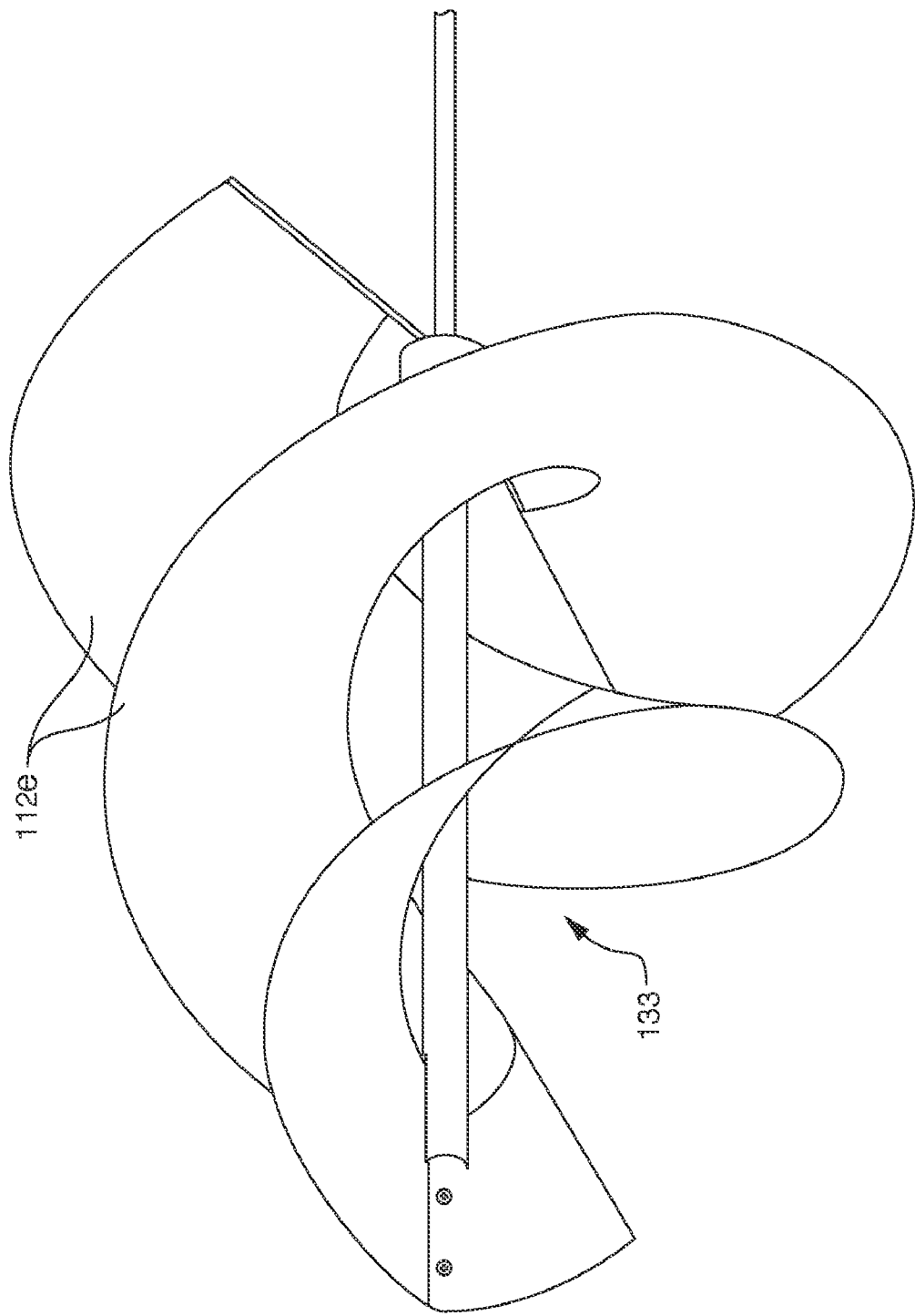

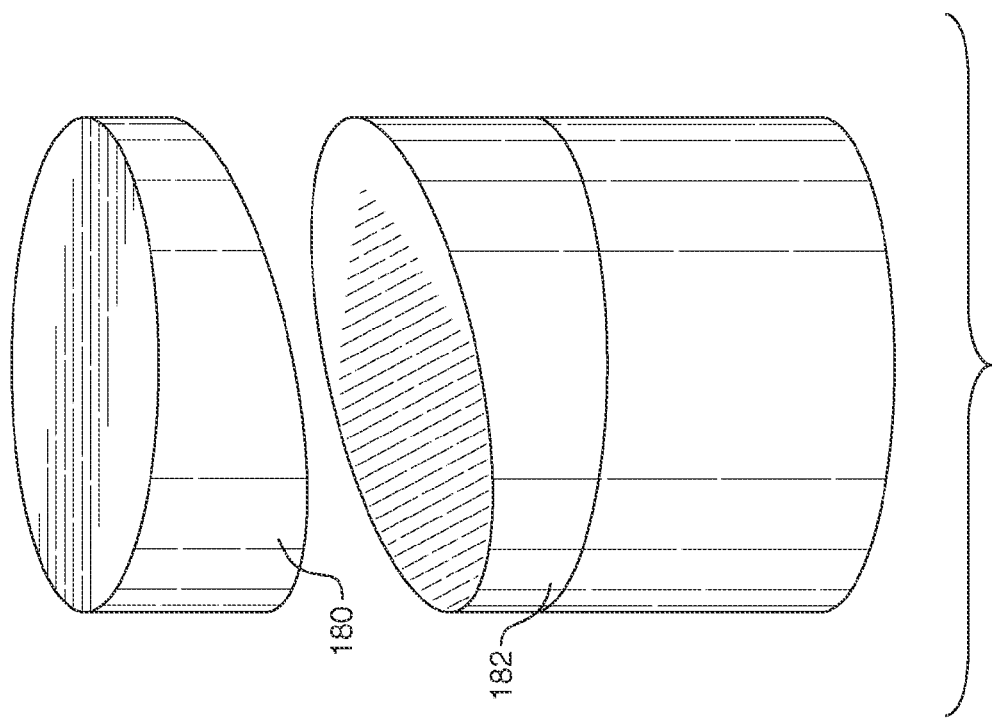

WIND TURBINE BLADE ASSEMBLY AND APPARATUS

CROSS REFERENCE TO RELATED APPLICATIONS

This application claims the benefit of priority under 35 U.S.C. §119(e) to U.S. provisional application No. 60/881,748 filed Jan. 22, 2007, and U.S. provisional application No. 60/934,450 filed Jun. 13, 2007. The entire contents of the aforementioned provisional applications are incorporated herein by reference in their entireties.

BACKGROUND

The present disclosure relates generally to the field of wind turbine or windmill devices for the conversion of a flow power from a stream of air or other fluid into rotary mechanical power and, more specifically, to wind turbine devices of the horizontal axis type having a plurality of helical blades. In a preferred aspect of this disclosure, wind turbine blade assemblies and devices are provided wherein the helical blades are offset from the axis of rotation of the blade assembly. In an especially preferred embodiment, the radial distance between the axis of rotation and the radially inward edge of the helical blades is approximately equal to one-half the radial thickness of the blades.

SUMMARY

In one aspect, a wind turbine blade assembly includes a central shaft defining an axis of rotation and a plurality of helically twisted blades supported on the central shaft. The helically twisted blades have an inner edge and an outer edge, and at least a portion of the helically twisted blades is radially spaced apart from the central shaft.

In another aspect, a wind turbine apparatus includes a wind turbine blade assembly having a central shaft defining an axis of rotation and a first plurality of helically twisted blades supported on the central shaft. Each of the first plurality of helically twisted blades has an inner edge and an outer edge, wherein at least a portion of each of the first plurality of helically twisted blades is radially spaced apart from the central shaft. A support member rotatably supports the wind turbine blade assembly.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 12B is a perspective view of the embodiment appearing in FIG. 12A.

FIG. 13 illustrates beveled discs which may be employed to keep the wind turbine aligned with a prevailing or preferred wind direction.

DETAILED DESCRIPTION OF THE PREFERRED EMBODIMENTS

Figure 1:
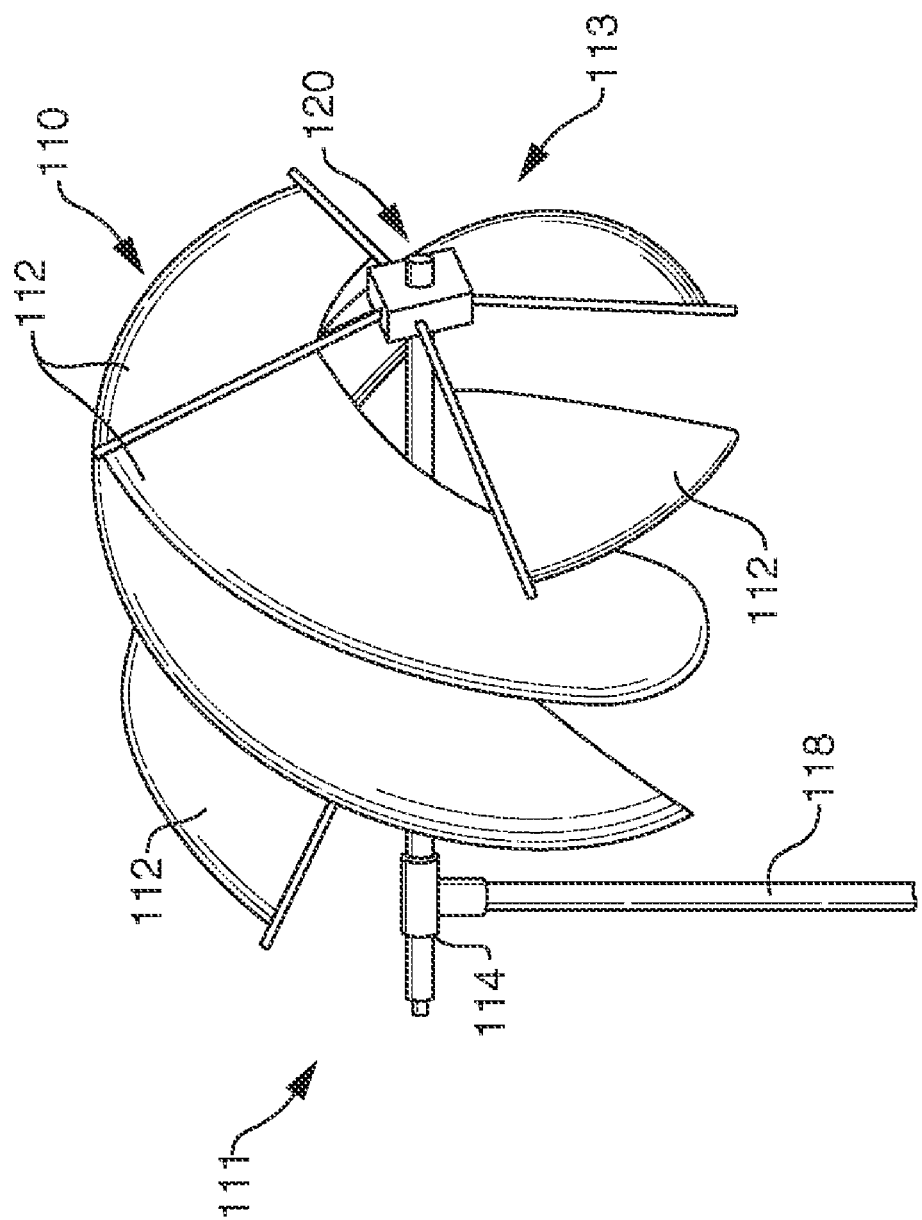
FIG. 1 is a rear perspective view of a wind turbine device in accordance with a first exemplary embodiment of the invention.
Figure 2:
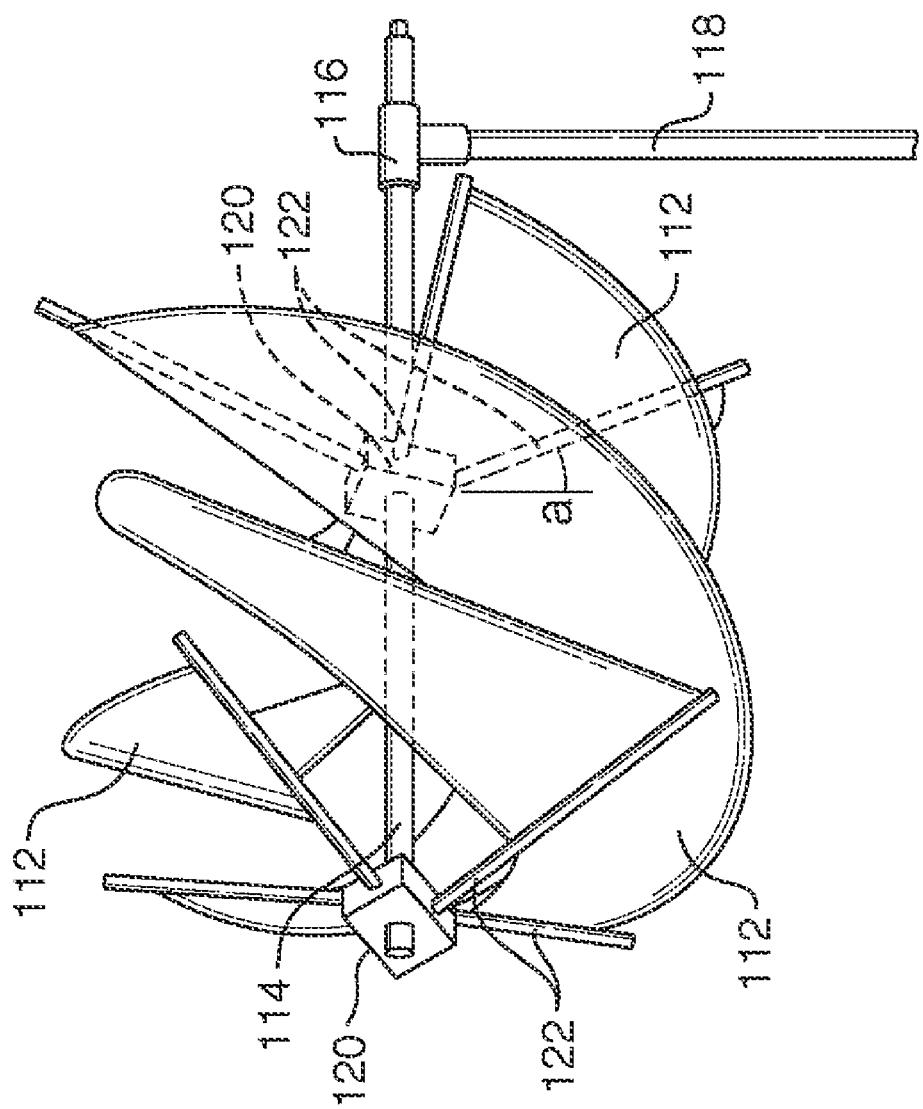
FIG. 2 is a generally side view of the embodiment depicted in FIG. 1.

Referring now to the drawings, wherein like reference numerals denote like or analogous components throughout the several views, FIGS. 1 and 2 depict a first embodiment wind turbine device, which represents one possible embodiment of the invention. The device includes a turbine blade assembly 110 comprising a plurality of helically twisted blades 112, which are helically twisted about a central rotatable shaft 114. The shaft 114 is coaxially and rotatably supported on a horizontally-extending, e.g., cantilevered arm 116. In the depicted embodiment, the arm 116 is generally tubular. The shaft 114 may be rotatably supported on bearings in the arm 116 to reduce friction. The arm 116 is supported on an upright support 118, which may be anchored to the ground or otherwise securely attached to a support surface. Alternatively, the rotatable shaft 114 may be tubular to coaxially receive the cantilevered arm 116, with the tubular rotatable shaft 114 supported on bearings on the arm 116.

Although the depicted embodiments are shown and described herein with reference to the preferred embodiments wherein the wind turbine apparatus is of the horizontal axis type wherein the axis of rotation is generally parallel to the direction of air flow, it will be recognized that the blade assemblies herein are also operable in the vertical orientation or wherein the rotational axis is otherwise maintained in a direction which is generally perpendicular to the direction of air flow. Similarly, although the wind turbine blade assemblies are primarily described herein by way of reference to the preferred embodiments wherein rotational mechanical energy is extracted from wind potential energy, it will be recognized that the blade assembly embodiments herein may be employed in other applications. For example, the central shaft of the blade assemblies herein may be rotationally coupled to a motor such as an electric motor or other energy input device to accelerate air or other fluid, e.g., in ventilation or other applications.

The blade assembly 110 further includes a plurality of hubs 120 axially spaced along the length of the shaft 114. There are front and rear hubs 120 in the embodiment of FIGS. 1 and 2. Each hub 120 includes a plurality of radially extending blade support members or spokes 122. In the depicted preferred embodiment, the support arms 122 are inclined with respect to a plane extending perpendicular to the shaft 114 by an angle, a, in the forward or upwind direction. Preferably, the support arms 122 are inclined by an angle a of approximately zero to approximately 35 degrees, more preferably, approximately 12 to approximately 25 degrees, and most preferably about 15 to about 22.5 degrees. The angle a of the spokes for different hubs on the shaft 114 may be the same or different. For example, the angle of incline a may be greater for spokes on the forward or upwind end 111 than for the trailing or downwind end 113. The support arms 112 may be made from any rigid material, including metal or metal alloy (including without limitation steel pipe, spring steel, etc.), and are preferably formed of a high-strength, lightweight material, such as fiberglass or other fiber-reinforced resin composite material, or the like.

The blades 112 may be made of any lightweight material. The blades 112 may be formed of a lightweight sheet material, such as plastic, metal or metal alloy, composite material, or the like. In preferred embodiments, the blades may be formed of a sheet material which is sufficiently flexible to form a helical blade structure, while having a sufficient rigidity to retain its shape. With a sufficiently rigid material, it is possible to support the blades using only front and rear hubs/spokes (see FIGS. 1 and 2). If a non-rigid material such as kite fabric or the like is used, one or more intermediate hubs are used (see FIG. 14). Alternatively, the blades 112 may be formed of a non-rigid material, such as a natural or synthetic fabric, such as nylon or the like. Advantageously, the blades 112 may be formed of a kite fabric.

The blades may be secured to the support arms 122 via a number of fastening means, including without limitation rivets, clips, dogs, pawls, clamps, screws, bolts, stitching, adhesives, integrally formed sleeves on the blades for receiving the spokes (e.g., sewn or otherwise), crimping, etc., or combinations thereof. Each blade 112 is preferably continuous, although blades which are segmented along their lengths are also contemplated. The blades are preferably cut from flat stock material and exemplary flat blade blanks are described in greater detail below. However, the blades may be formed by any of a number of means, including without limitation, molding, extrusion, weaving, and so forth.

In the depicted embodiment of FIGS. 1 and 2, there are four helical blades 112, spaced apart from each other at 90-degree intervals. The helical twist of each blade is 180 degrees from front to rear. There are two (front and rear) hubs 120, each carrying support 4 support arms 122. It will be recognized that other numbers of blades, other numbers of hubs, other degrees of spacing between adjacent blades, and other degrees of end-to-end helical twist of the blades may be employed. Table 1 below summarizes some alternative combinations of blade number, angular spacing between adjacent blades and helical end-to-end twist of each blade, which are exemplary and illustrative only and are not intended to be limitative of the invention. It will be recognized that other numbers of blades, blade spacing and blade helical twist may be employed.

TABLE 1

| Number of Blades | Angular Spacing | Helical Twist |
| --- | --- | --- |
| 2 | 180 | 180 |
| 2 | 180 | 270 |
| 3 | 120 | 120 |
| 3 | 120 | 240 |
| 3 | 120 | 360 |
| 4 | 90 | 90 |
| 4 | 90 | 180 |
| 4 | 90 | 270 |

TABLE 1-continued

| Number of Blades | Angular Spacing | Helical Twist |
| --- | --- | --- |
| 4 | 90 | 360 |
| 5 | 72 | 72 |
| 5 | 72 | 144 |
| 5 | 72 | 216 |
| 5 | 72 | 280 |
| 5 | 72 | 360 |
| 6 | 60 | 60 |
| 6 | 60 | 120 |
| 6 | 60 | 180 |
| 6 | 60 | 240 |
| 6 | 60 | 300 |
| 6 | 60 | 360 |
| 8 | 45 | 45 |
| 8 | 45 | 90 |
| 8 | 45 | 135 |
| 8 | 45 | 180 |
| 8 | 45 | 225 |
| 8 | 45 | 270 |
| 8 | 45 | 315 |
| 8 | 45 | 360 |
| 9 | 40 | 40 |
| 9 | 40 | 80 |
| 9 | 40 | 120 |
| 9 | 40 | 160 |
| 9 | 40 | 200 |
| 9 | 40 | 240 |
| 9 | 40 | 280 |
| 9 | 40 | 320 |
| 9 | 40 | 360 |
| 10 | 36 | 36 |
| 10 | 36 | 72 |
| 10 | 36 | 108 |
| 10 | 36 | 144 |
| 10 | 36 | 180 |
| 10 | 36 | 216 |
| 10 | 36 | 252 |
| 10 | 36 | 288 |
| 10 | 36 | 324 |
| 10 | 36 | 360 |
| 12 | 30 | 30 |
| 12 | 30 | 60 |
| 12 | 30 | 90 |
| 12 | 30 | 120 |
| 12 | 30 | 150 |
| 12 | 30 | 180 |
| 12 | 30 | 210 |
| 12 | 30 | 240 |
| 12 | 30 | 270 |
| 12 | 30 | 300 |
| 12 | 30 | 330 |
| 12 | 30 | 360 |
| 15 | 24 | 24 |
| 15 | 24 | 48 |
| 15 | 24 | 72 |
| 15 | 24 | 96 |
| 15 | 24 | 120 |
| 15 | 24 | 144 |
| 15 | 24 | 168 |
| 15 | 24 | 192 |
| 15 | 24 | 216 |
| 15 | 24 | 240 |
| 15 | 24 | 264 |
| 15 | 24 | 288 |
| 15 | 24 | 312 |
| 15 | 24 | 336 |
| 15 | 24 | 360 |
| 16 | 22.5 | 22.5 |
| 16 | 22.5 | 45 |
| 16 | 22.5 | 67.5 |
| 16 | 22.5 | 90 |
| 16 | 22.5 | 112.5 |
| 16 | 22.5 | 135 |
| 16 | 22.5 | 157.5 |
| 16 | 22.5 | 180 |
| 16 | 22.5 | 202.5 |
| 16 | 22.5 | 225 |
| 16 | 22.5 | 247.5 |
| 16 | 22.5 | 270 |

TABLE 1-continued

| Number of Blades | Angular Spacing | Helical Twist |
|---|---|---|
| 16 | 22.5 | 292.5 |
| 16 | 22.5 | 315 |
| 16 | 22.5 | 337.5 |
| 16 | 22.5 | 360 |
| 18 | 20 | 20 |
| 18 | 20 | 40 |
| 18 | 20 | 60 |
| 18 | 20 | 80 |
| 18 | 20 | 100 |
| 18 | 20 | 120 |
| 18 | 20 | 140 |
| 18 | 20 | 160 |
| 18 | 20 | 180 |
| 18 | 20 | 200 |
| 18 | 20 | 220 |
| 18 | 20 | 240 |
| 18 | 20 | 260 |
| 18 | 20 | 280 |
| 18 | 20 | 300 |
| 18 | 20 | 320 |
| 18 | 20 | 340 |
| 18 | 20 | 360 |

The number of hubs 120 may be conveniently be selected by dividing the helical end-to-end twist of each blade 110 by the angle of spacing between adjacent blades and adding 1. Of course any other number of hubs 120 sufficient to support the blades 112 along their lengths may be selected, and may be determined by other factors, such as the size of the blades, the strength or rigidity of the blade material, and so forth. In other embodiments, the hubs 120 may be omitted and the radial spokes secured directly to the axial shaft (see FIGS. 3 and 4).

In the depicted preferred embodiments herein, the blades within a given blade assembly are the same. It will be recognized, however, that the blades within a blade assembly may be different. For example, blades having a different length/helical twist may be employed. For example, in an embodiment having eight blades, four blades may extend the full length of the blade assembly and four blades may extend one-half of the length. Likewise, blades of different diameter may also be provided on a blade assembly.

In the embodiment of FIGS. 1 and 2, the wind turbine device configured as a downwind turbine device. That is, the blade assembly is positioned downwind of the vertical post 118. It will be recognized, however, that the blade assemblies herein may also be configured as upwind devices, wherein the vertical support member 118 is disposed rearwardly of the blade assembly. In this manner, turbulence of the air flow entering the blade assembly 110 caused by the presence of a vertical support structure upwind of the blade assembly can be avoided. However, in the case of an upwind turbine device, a vane or other means for pointing the device into the wind is required.

Figure 3:
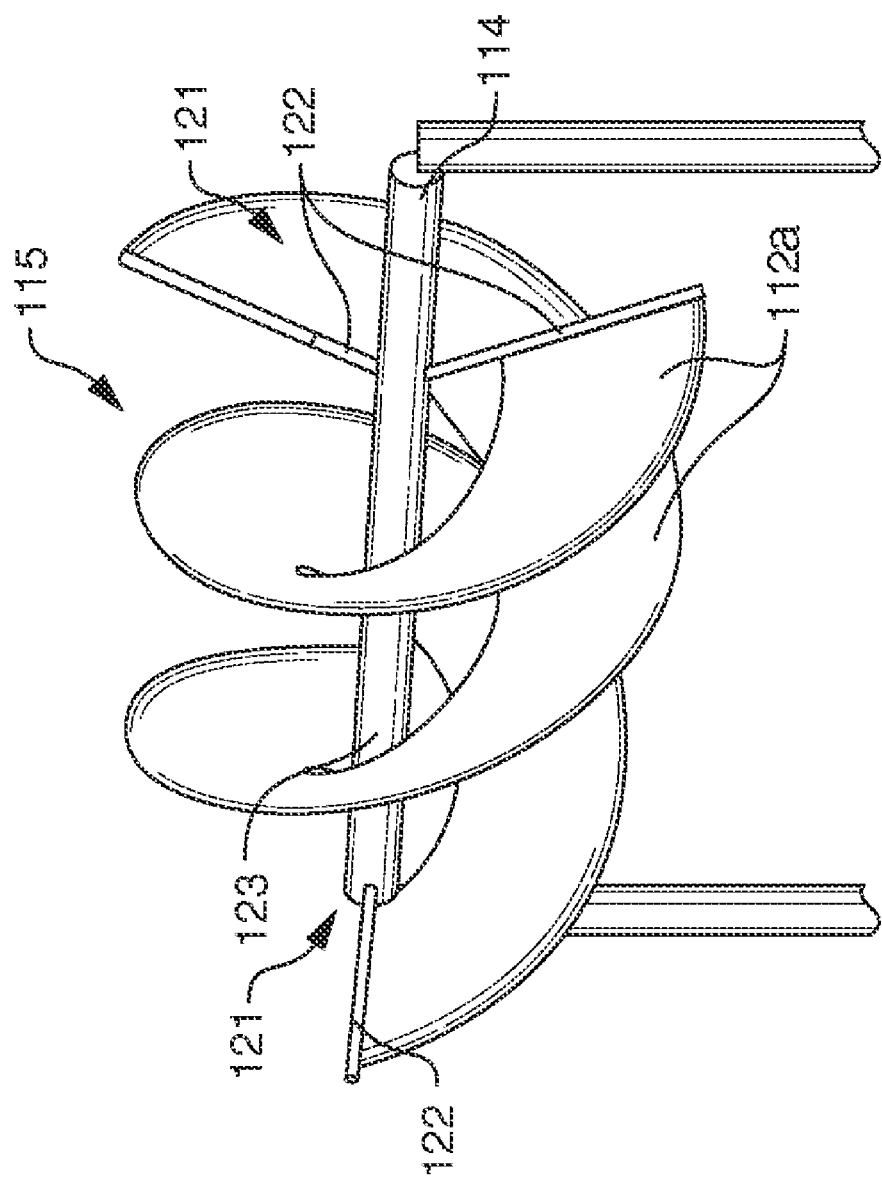
FIG. 3 is a generally side view of a wind turbine blade assembly in accordance with a second exemplary embodiment of the invention.

Referring now to FIG. 3, there appears a second embodiment wind turbine blade assembly 115, which is similar to the blade assembly appearing in the embodiment of FIGS. 1 and 2, but wherein the blade assembly 115 includes 2 blades 112a. Also, the hubs are omitted and the support arms 122 are attached directly to the rotating shaft 114 at 2 hub regions 121, and further wherein each blade has a helical end-to-end twist of about 450 degrees.

The blades 112a are secured to the spokes 122 by crimping and using additional fasteners such as rivets, adhesives, or other fasteners as described above. One or more additional support members providing additional bracing or support for the blades 112a may also be provided and need not be attached to the blade.

Figure 4:
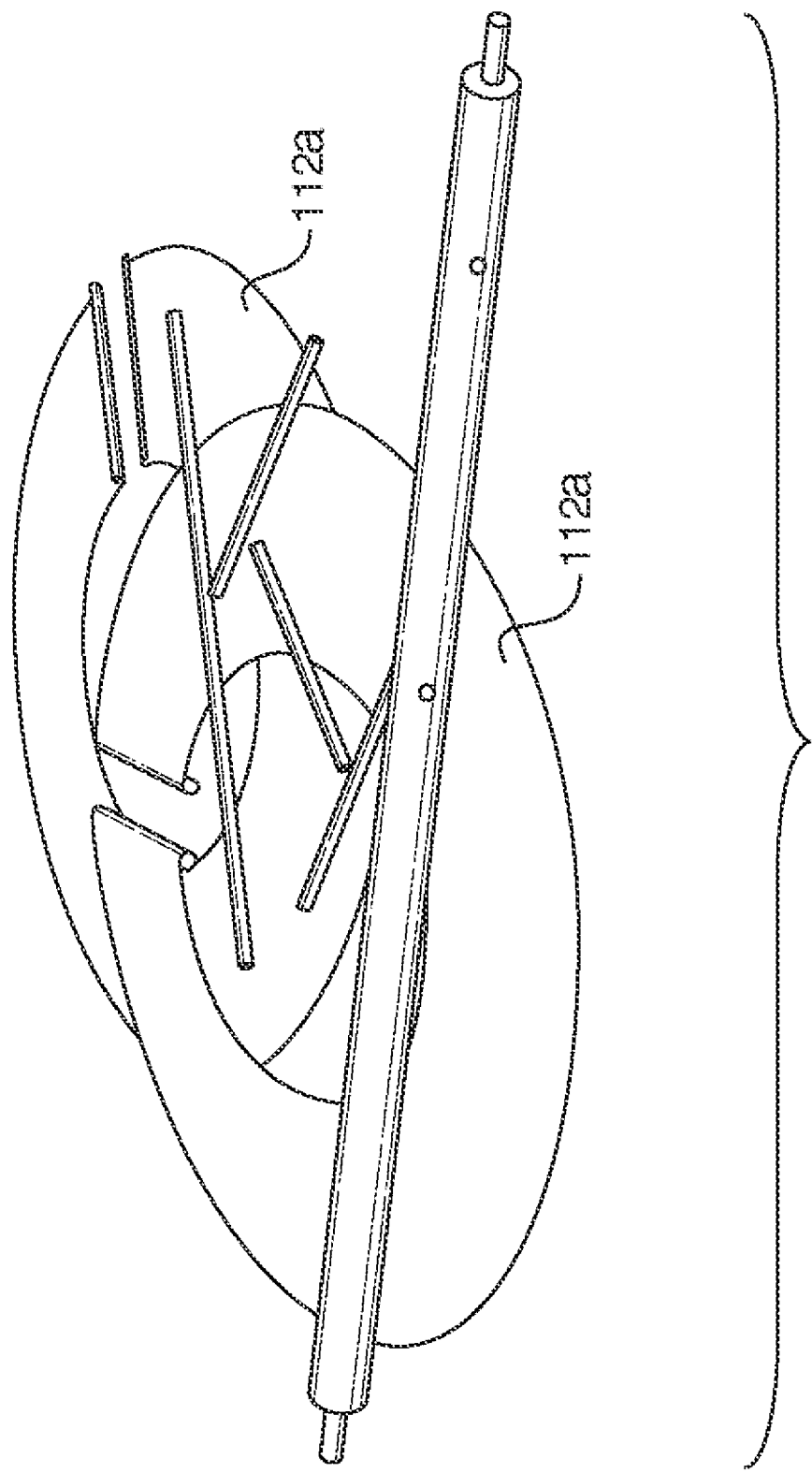
FIG. 4 is a perspective view illustrating the blades of the FIG. 3 embodiment disassembled from the blade assembly.

Referring now to FIG. 4, there is shown the components of the blade assembly 115 in a disassembled state. Each blade 112a is formed of a generally circular strip of sheet material. In the depicted preferred embodiment of FIGS. 3 and 4, the circular strip has an internal radius R and an outer radius 2R, such that the radial thickness T of the circular strip is equal to R. However, circular and partial circular blades with other thicknesses are also contemplated.

The cantilevered arm 116 is rotatable with respect to the vertical support 118 to allow the wind turbine blade assembly to be directed so that the front end thereof is facing into the wind. The embodiment of FIGS. 1 and 2 is a downwind device and is thus self-aligning with the wind direction. It will be recognized that the embodiment of FIGS. 1 and 2 may be configured as an upwind device by providing a means for aligning the device with the wind. The alignment means may be a passive means, such as a wind vane or fin, e.g., carried on the cantilevered arm 116.

Alternatively, an active means for aligning the device with the wind may be provided, such as a wind sensor coupled to a servo control for sensing the wind direction and rotating the blade assembly into alignment with the wind automatically under preprogrammed control. An active means may also be employed to regulate the rotational speed of the device, for example, by rotating the device to effectively reduce the swept area and thus reduce wind resistance and rotational speed. In this manner, the rotational speed of the blade assembly can be regulated to ensure that the rotational output of the device is suitable or appropriate for a device being operated. Such active or passive alignment means may optionally also be provided with a wind turbine device herein configured as a downwind device to facilitate alignment of the device with the wind and/or regulate the rotational speed.

Figure 14:
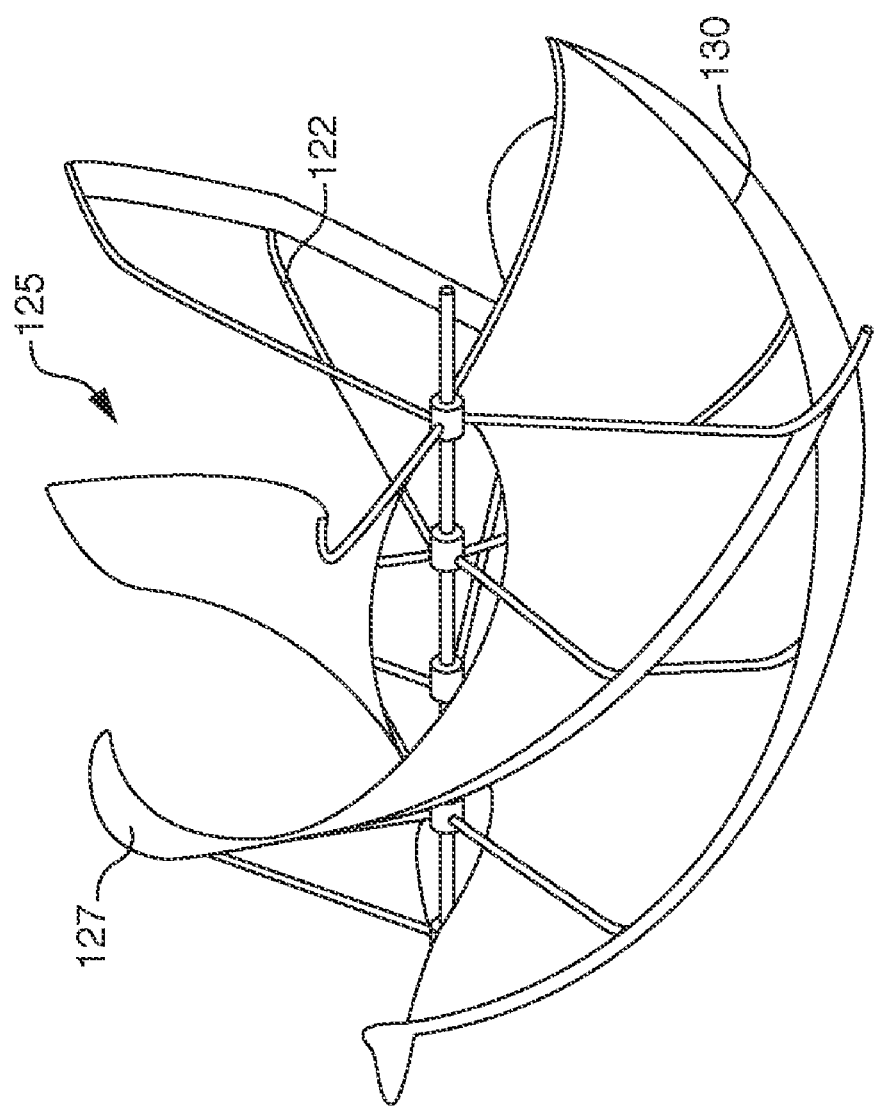
FIG. 14 illustrates an exemplary blade assembly embodiment wherein the outer edge of each of the blades has a lip.

Further embodiments may be as described herein, but wherein the spokes ends and blade edges are curved inward to form a lip at the radially outward edge of the blades. An exemplary blade assembly embodiment 125 having a lip 127 appears in FIG. 14. FIG. 14 also shows an exemplary embodiment wherein the ends of the spokes 122 are reinforced by optional helical support members 130. The reinforcement members reinforce the blade and blade assembly and also protect persons near the blade assembly from the ends of the spoke ends as the turbine rotates.

The wind turbine devices in accordance with the present development may be used with all manner of machinery or devices capable of utilizing rotational mechanical energy. Many practical mechanisms for coupling a rotary shaft to a device or machine to be operated are known by those skilled in the art. Any conventional mechanical linkage between the rotating shaft 114 and a machine or device to be operated may be used, including gear trains, drive shafts, belt/pulley or chain drive systems, or the like. A gear box for outputting a rotational speed that is suitable for the device to be operated may also be coupled to the shaft 114.

The rotational energy of the shaft 114 may be mechanically coupled directly to a machine to be operated, such as a pump, compressor, grinding stone, etc. Alternatively, the rotation of the shaft may be mechanically coupled to a device for converting rotational mechanical energy into electrical power. For example, rotation of the shaft 114 may be coupled to a rotatable shaft of an alternator for generating an AC electrical output, for example, which may in turn be electrically coupled to an electricity grid or other electrical system. Alternatively, the rotation of the shaft 114 may be coupled to a generator for generating a DC electrical output, e.g., for generating and storing electricity via a battery storage device.

One or more safety devices are also contemplated. For example, a spring may be provided which causes the arm 116 and/or shaft 114 to fold back in the event of excessive wind speed and/or an out of balance condition as might be caused in wet weather or snow or ice conditions. By pivoting the arm, the blade assembly is moved out of alignment with the wind direction, thereby effectively reducing the swept area and reducing the rotational speed of the blade assembly.

Referring again to FIGS. 1 and 2, the helical blades 112 of wind turbine device 110 wherein are supported on the spokes 122 such that the radially inward edge of the helical blade stands off with respect to the central shaft 114 to define an axially extending opening or passageway therealong. Preferably, the blades 112 stand off by a distance which is equal to about one-half of the radial thickness of the blade.

The blades 112 may be formed of any generally rigid sheet material, including sheet metal, plastic, composite materials, and the like. The embodiments of FIGS. 1 and 2 include forward and rear hubs 120, each having four spokes 122. Since the blade is rigid, additional intermediate sets of spokes are not required, although it is contemplated that the blade may be supported along its length by one or more sets of spokes, or alternatively, by support members attached to the center shaft and supporting or bearing against the blade at one or more positions along the length of the blades. The blade may be secured to the spokes via crimping about the spoke and riveting, or via other fastener type, as described above.

Referring now to FIGS. 3 and 4, a further, two-blade embodiment blade assembly 115 in the assembled and disassembled state, respectively is shown. In the disassembled state (FIG. 4), the blades 112a may be formed of a circular blank of sheet material. In a preferred embodiment, the blade is generally circular strip, in which the inner diameter is equal to about one-half the outer diameter. That is, the central opening in the blank is equal to two times the radial thickness of the strip. In the embodiment of FIGS. 3 and 4, the hubs are omitted and the spokes 122 are secured directly to the central shaft 114. The blades are supported by spokes 122 at the front and rear, with intermediate support rods 130 supporting the blade at intermediate positions along its length.

In the assembly 115, the blades 112a are helically arranged about the central shaft so that the inner edge of the blades 112a are displaced from the shaft 114, and in the preferred embodiment, this radial displacement is approximately one-half the radial thickness of the blade, as measured from the center axis of the shaft to define a central opening. That is, the diameter of the central opening passage is equal to about one-third of the diameter of the turbine blade assembly 115.

Other stand off distances are contemplated and the stand off distance can vary along the axial length of the blade assembly. For example, one or both ends of the blade assembly can be immediately adjacent the shaft and the remainder of the blade assembly may be spaced apart from the shaft. For example, FIGS. 12A-12C show a blade assembly 133 having two helical blades 112e, in which the forward end of the blades are not radially spaced apart from the shaft 114 and the rearward end of the blades 112e are radially spaced apart from the shaft 114.

Figure 5A:
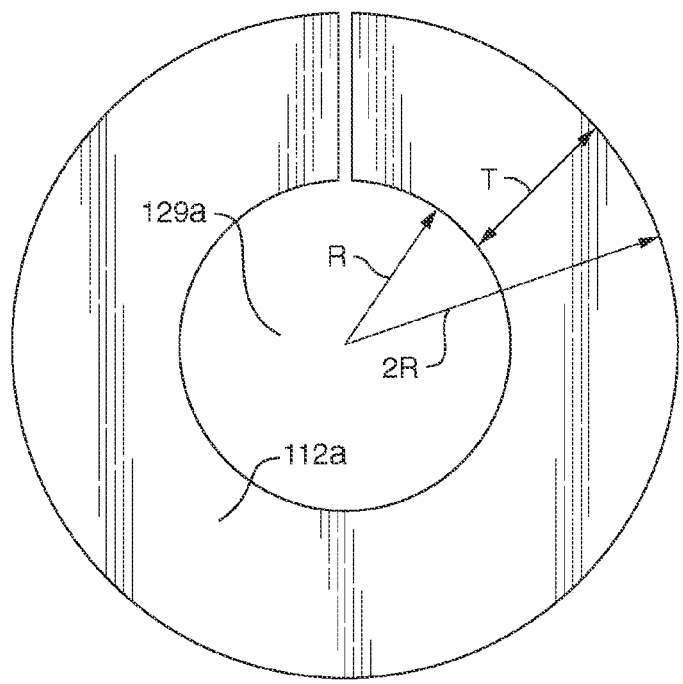
FIGS. 5A-5D are plan views of exemplary is flat blanks which may be used to form the helical blades herein.
Figure 5B:
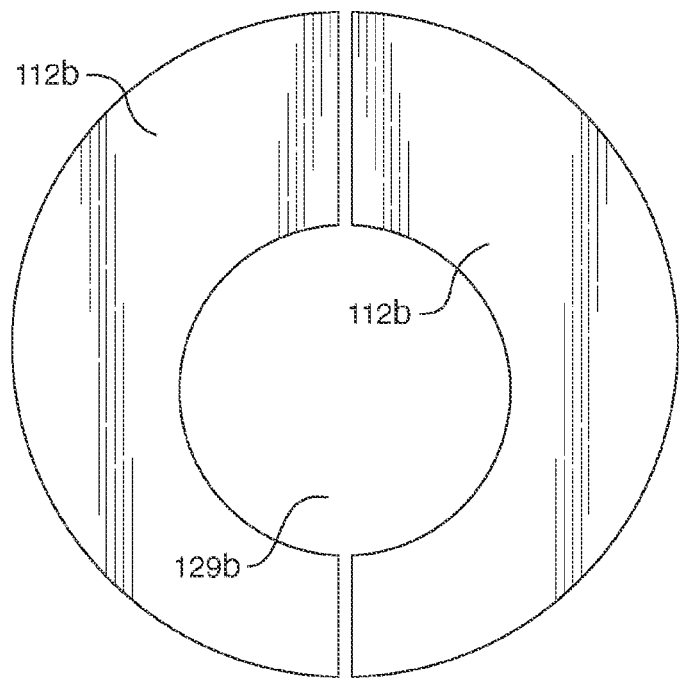
Figure 5C:
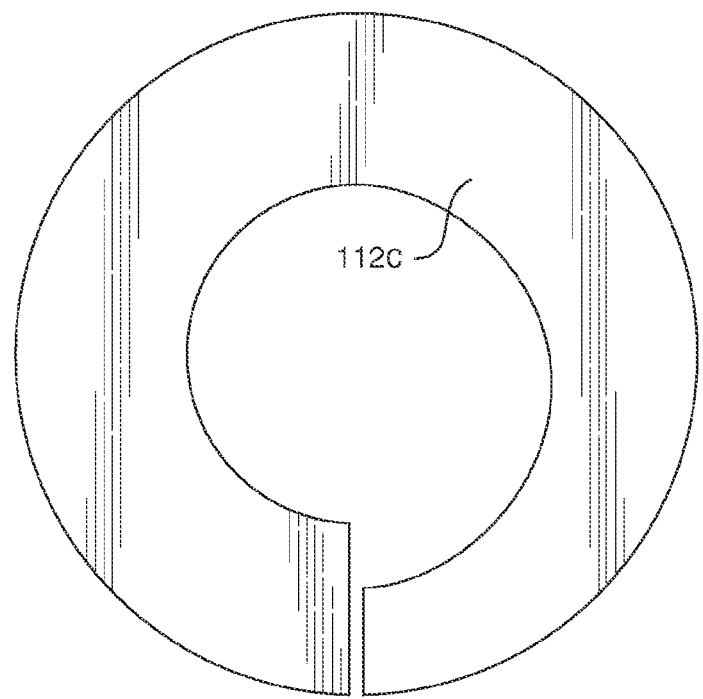
Figure 5D:
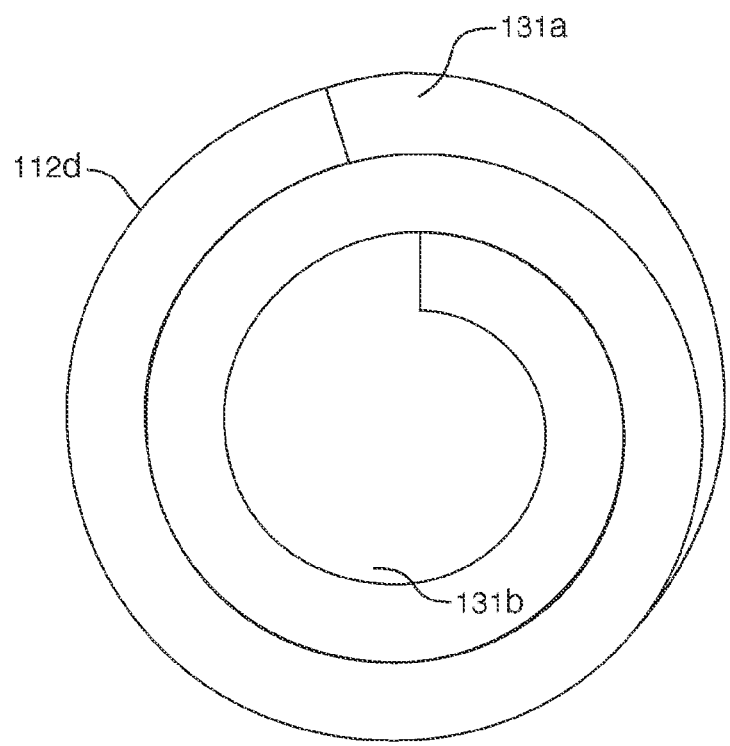

FIG. 5A depicts a preferred, generally circular flat blade blank 112a having a uniform radial thickness T which is equal to the radius R of the central opening 129a. It will be recognized that a number of variations are possible. For example, in producing a turbine blade blank, the central blank opening may be offset from center to produce a tapered blade. FIG. 5B illustrates the manner of producing two semicircular flat blade blanks 112b having a tapering radial thickness produced by offsetting the central opening 129b. FIG. 5C illustrates a generally circular flat blade blank 112c having a tapering radial thickness. Yet another turbine blade blank 112d which may be formed of a generally circular piece of stock material appears in FIG. 5D, with minimal waste portions 131a and 131b.

Figure 12A:
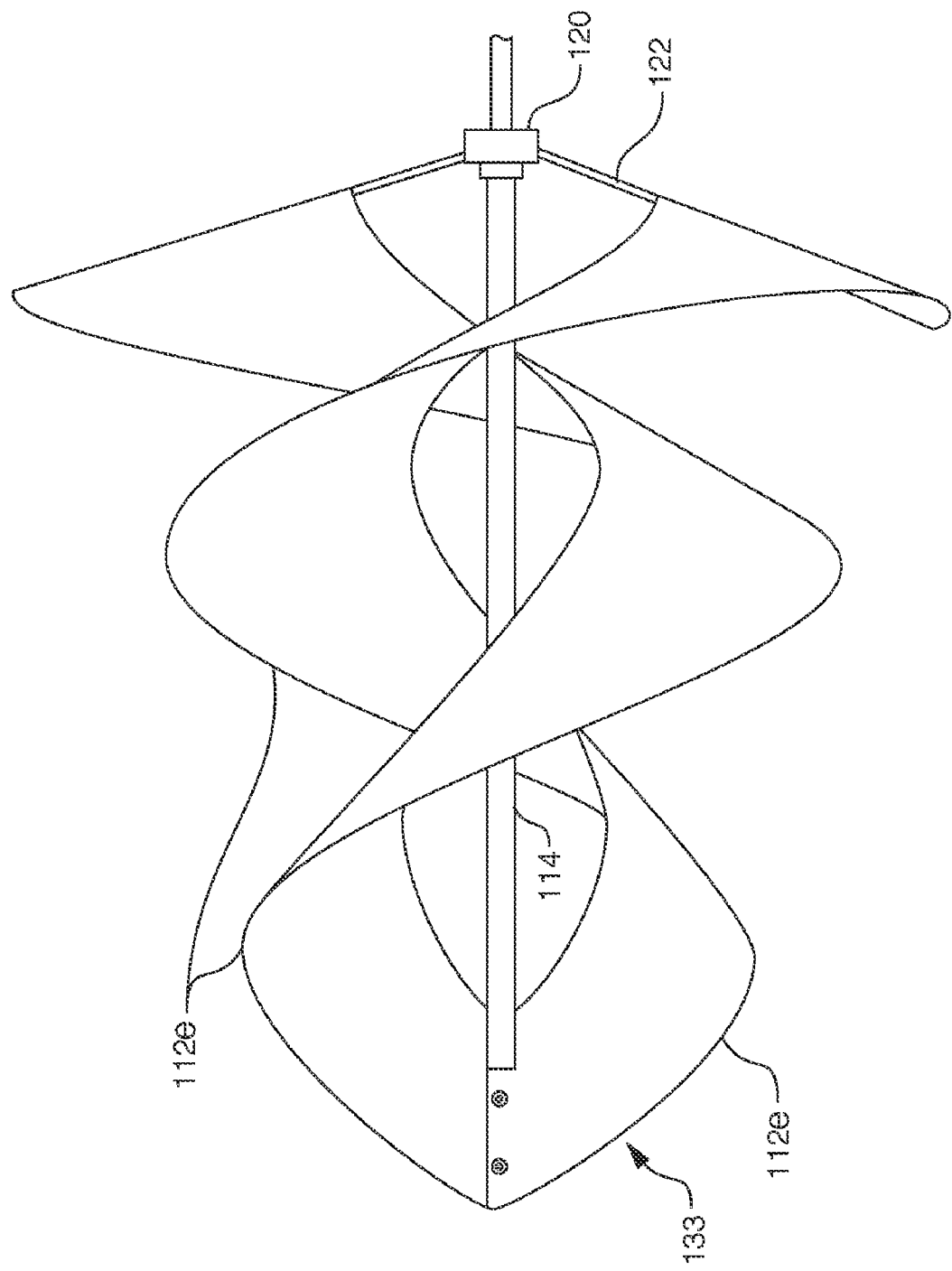
FIG. 12A is a side view of a wind turbine blade assembly according to a sixth exemplary embodiment of the present disclosure.
Figure 12C:
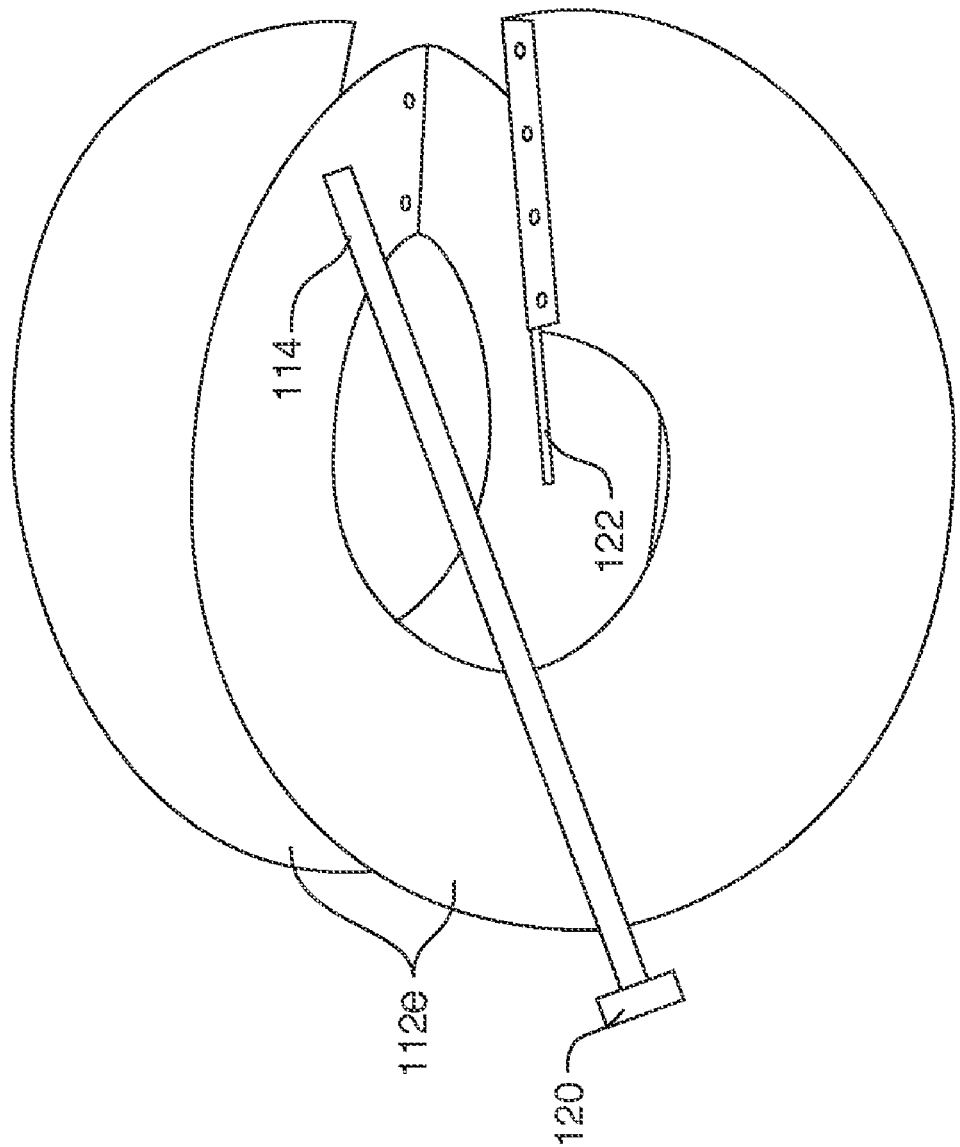
FIG. 12C shows the blade assembly of FIGS. 12A and 12B in a disassembled state.

An exemplary, two-blade wind turbine blade assembly 133 employing tapered blades 112e appears in FIGS. 12A-12C, wherein the blades 112e are along the lines of the blades 112c appearing in FIG. 5C. Other blade blanks based on partial circular strips are contemplated, including tapered and non-tapered strips, and including half circle, one-third circle, quarter circle, and other partial circular strips.

Figure 6:
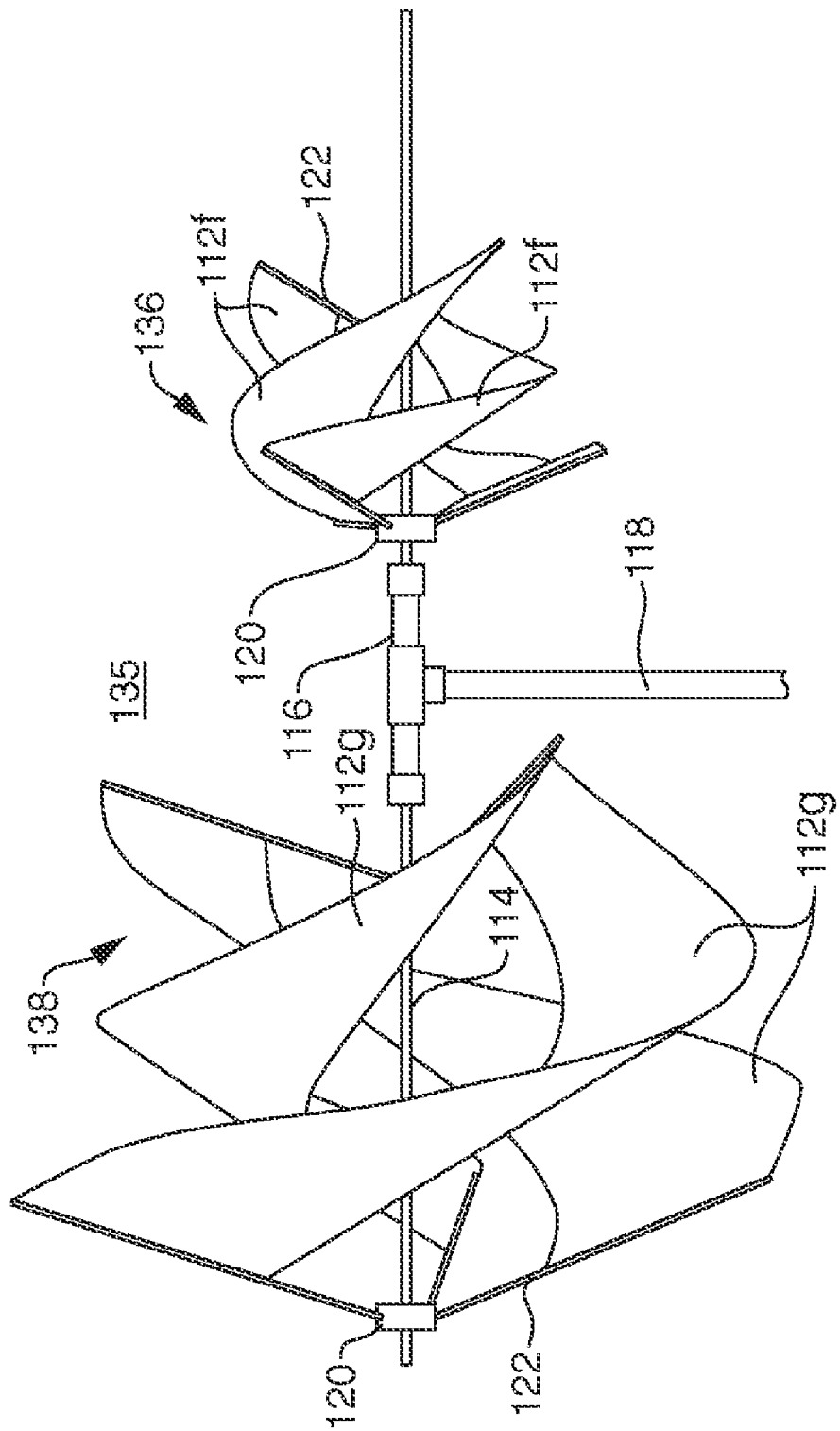
FIG. 6 is a side view of a wind turbine device in accordance with a third exemplary embodiment of the invention.
Figure 7:
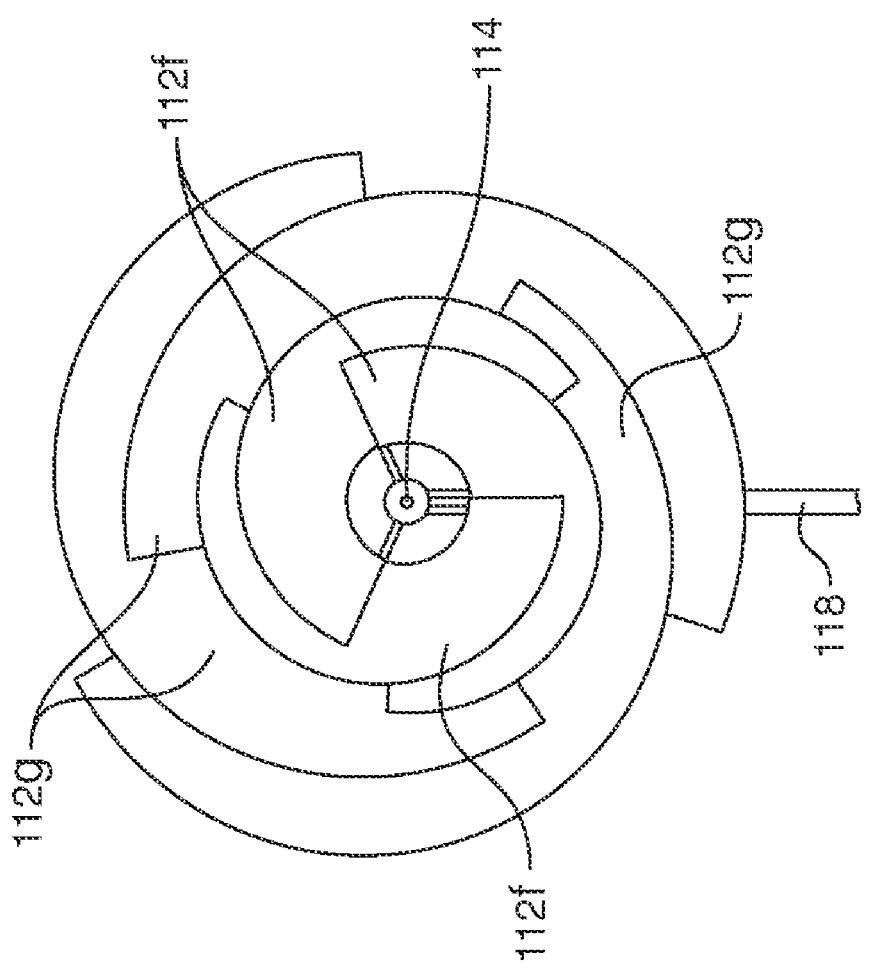
FIG. 7 is a front view of the embodiment depicted in FIG. 6.
Figure 8:
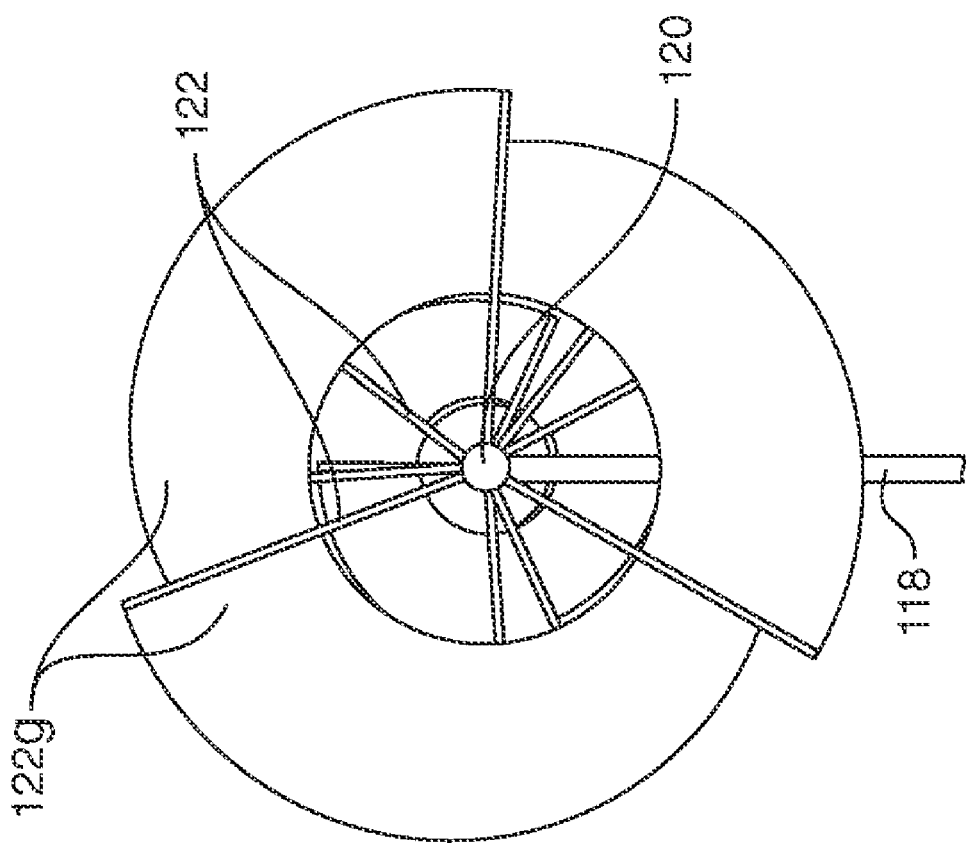
FIG. 8 is a rear view of the embodiment depicted in FIG. 6.

In further embodiments, a plurality of blade assemblies may be supported on a single unit. With reference now to FIGS. 6-8, an exemplary wind turbine device 135 includes a first, upwind blade assembly 136 and a second, downwind blade assembly 138. The first blade assembly 136 includes three blades 112f, which are formed of generally circular flat blanks which have a tapered radial thickness which increases from front to rear. Each of the blades 112f are supported on spokes 122 in stand off relation with respect to a rotating shaft 114 supported on an upwind side of a horizontal arm 116, which in turn, is supported on a vertical leg 118. The blades 112f have an end-to-end helical twist of about 240 degrees.

The second blade assembly 138 includes three blades 112g, which are formed of a generally circular blank which have a tapered radial thickness which increases from front to rear. Each of the blades 112g are supported on spokes 122 in stand off relation with respect to the rotating shaft 114 supported on the downwind side of the horizontal arm 116. The blades 112g have an end-to-end helical twist of about 240 degrees.

Each of the first and second blade assemblies 136, 138 are constructed such that the distance along the spokes 122 between the axis of rotation of the shaft 114 and the radially inward edge of the blade is about one-half of the radial thickness of the blade as measured at the trailing edge of the blade assembly.

Figure 9:
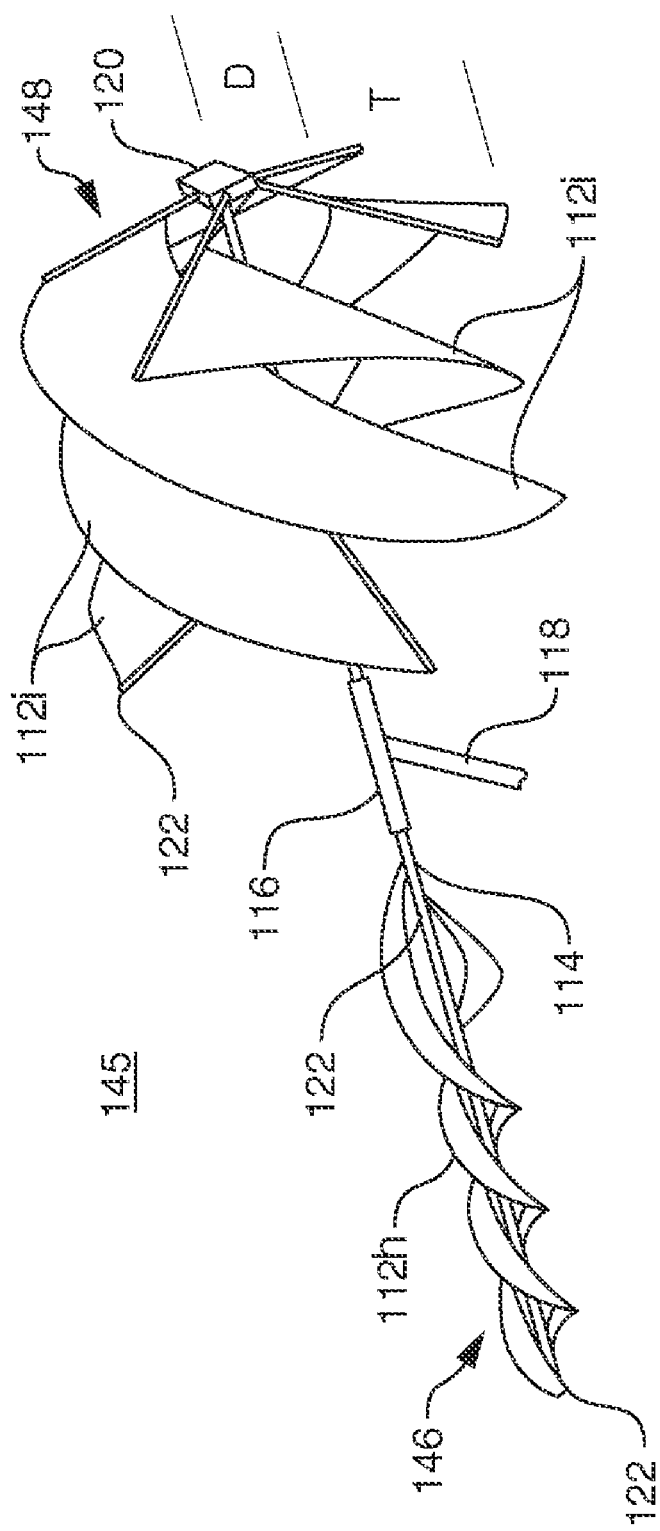
FIG. 9 is a perspective view of a turbine device in accordance with a fourth exemplary embodiment of the disclosure.

Referring now to FIG. 9, there is shown another dual blade assembly wind turbine device 145 includes a first, upwind blade assembly 146 and a second, downwind blade assembly 148. The first blade assembly 146 includes two blades 112h, each of which are supported on spokes 122 in stand off relation with respect to a rotating shaft 114 supported on an upwind side of a horizontal arm 116, which in turn, is supported on a vertical leg 118. The blades 112h have an end-to-end helical twist of about 720 degrees.

The second blade assembly 148 includes four blades 112i, which are formed of a generally semi circular blanks have a uniform radial thickness, wherein the inner radii of the flat semicircular blank is approximately equal to the radial thickness of the blank. Each of the blades 112i are supported on spokes 122 on hubs 120 in stand off relation with respect to the rotating shaft 114 supported on the downwind side of the horizontal arm 116. The blades 112i have an end-to-end helical twist of about 180 degrees.

Each second blade assemblies 148 are constructed such that the distance D along the spokes 122 between the axis of rotation of the shaft 114 and the radially inward edge of the blade is about one-half of the radial thickness T of the blade.

Figure 10:
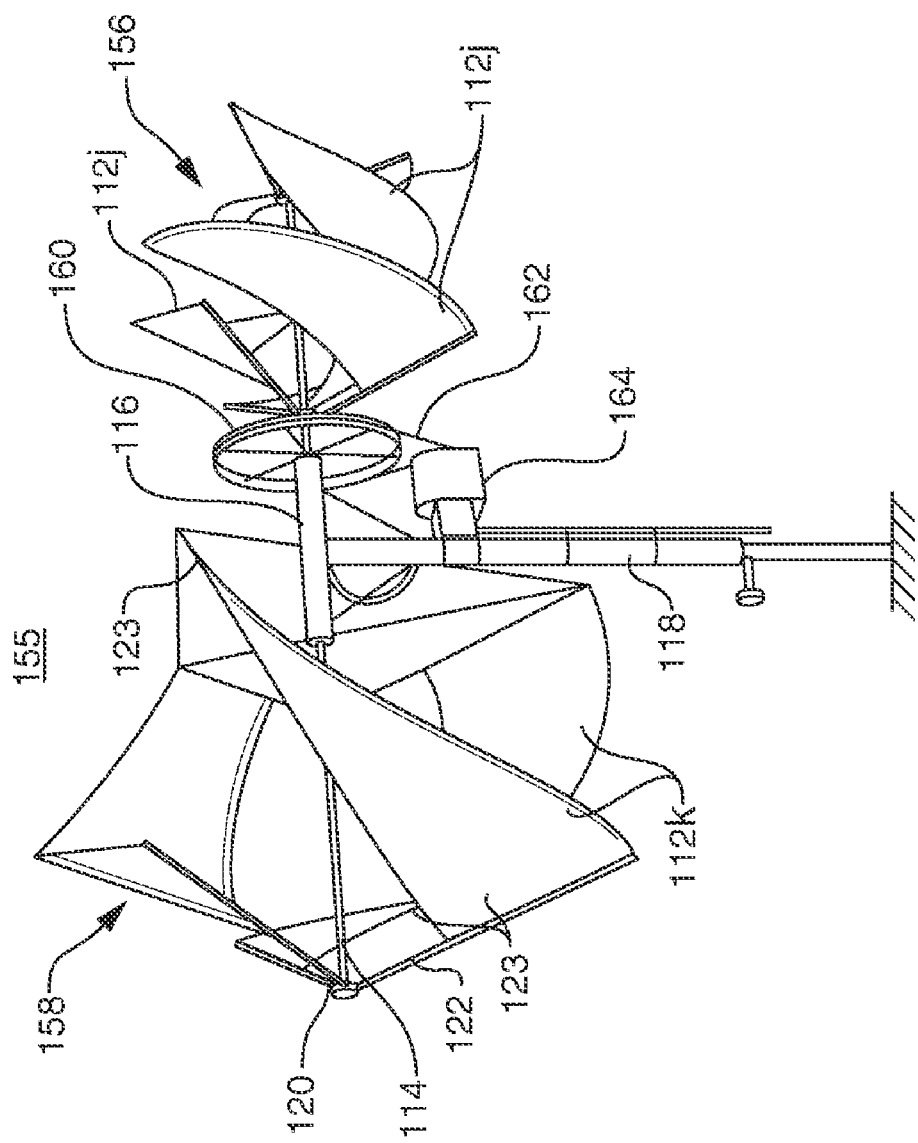
FIG. 10 is a side view of a wind turbine device in accordance with a fifth exemplary embodiment.
Figure 11:
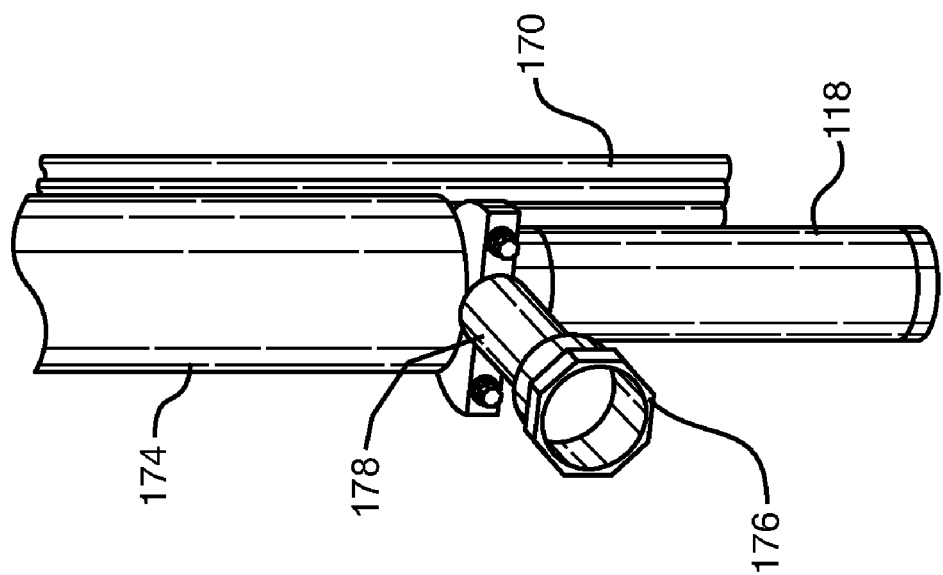
FIG. 11 is an enlarged view of the rotational dampening system appearing in FIG. 10.

Referring now to FIGS. 10 and 11, there is illustrated an exemplary rotational damping system for preventing undue rotation of the turbine device. FIG. 10 illustrates a turbine device 155 herein having a first, upwind blade assembly 156 and a second, downwind blade assembly 158 supported on a horizontal shaft 114. The first blade assembly 156 includes three blades 112*j* and is as described above by way of reference to blade assembly 136 appearing in FIGS. 6-8.

The second blade assembly 158 includes three blades 112*k*, which are formed of a generally circular blank which have a tapered radial thickness which increases from front to rear. Each of the blades 112*k* is supported on spokes 122 in stand off relation with respect to the rotating shaft 114 supported on the downwind side of the horizontal arm 116, which is supported on a vertical leg 118. The blades 112*k* have an end-to-end helical twist of about 120 degrees. The rotating shaft 114 includes a pulley 160 and belt 162 for rotating the shaft of an alternator or generator 164 for the conversion of rotary mechanical power to electrical power. In the depicted preferred embodiment, the inner edges of the blades 112*j* and 112*k* are radially spaced a distance which is approximately equal to one-half the radial thickness of the respective blades.

The wind turbine blade assembly 158 also illustrates a preferred embodiment wherein the ends of the spokes 122 are reinforced with cables 123. Each spoke 122 is connected to adjacent spokes 122 on the same hub 120 via the cables 123 to provide additional reinforcement of the blade assembly.

The wind turbine device 155 additionally includes a spring means 170 and stop member 176 secured to the vertical support 118. An enlarged view of the stop is shown in FIG. 11.

Referring now to FIG. 11, the vertical support 118 includes an outer sleeve 174 coaxially and rotatably received on the vertical support member 118, which is affixed to the support surface and does not rotate. The spring means 170 are clamped to the outer sleeve 174 on the upwind side of the outer sleeve 174 and rotate with the outer sleeve 174 and with the turbine assembly in accordance with wind direction. The spring means 170 may be one or more spring rods, leaf springs, etc., and are flexible fiberglass rods in the illustrated embodiment. A horizontally-extending stop member 176 is clamped to the inner support post 118 and is preferably installed so that it extends in the direction of the prevailing winds for the turbine device 155 installation location.

The rotatable outer sleeve 174 allows the turbine to rotate and remain aligned with the wind direction. However, when the unit rotates such that the spring rods 170 engage the stop member 176, the spring rods flex and exert a force on the stop member 176 which urges the turbine device 155 to rotate in the opposite direction. The greater the degree of flex in the spring rods 170, the greater the return force. Preferably, the lower stop member 176 has a rotatable roller tube 178 or like rotating member which engages the spring rods 170. In this manner, the roller tube may rotate when it engages the spring means 170, thereby avoiding sliding contact and reducing wear. Due to the flexible nature of the spring means 170, the wind turbine 155 is provided with a range of rotation which is greater than 360 degrees allowing it to align itself with any wind direction, while at the same time preventing free rotation of the unit which may result in multiple revolutions, which in turn, may damage, for example, an electrical current-carrying cable that may be run through the center of the vertical support 118.

FIG. 13 shows a pair of beveled discs which may be employed to keep a wind turbine device aligned with a prevailing or preferred wind direction. An upper beveled disc 180 is installed in an outer, rotatable sleeve and a lower beveled disc 182 may be installed on an inner support, such that the inclined surfaces are aligned and facing. The discs 180, 182 may be formed of a low friction or self-lubricating polymer material. As the rotating sleeve rotates, the inclined surfaces move out of alignment and the upper disc 180 moves upward. The force of gravity, then, tends to return the wind turbine to the initial orientation. Central openings (not shown) in the discs 180, 182 may be provided to allow passage of a cable for carrying electrical current.

The invention has been described with reference to the preferred embodiments. Modifications and alterations will occur to others upon reading and understanding the preceding detailed description. It is intended that the invention be construed as encompassing all such modifications and alterations insofar as they come within the scope of the appended claims or the equivalents thereof.

Having thus described the preferred embodiments, the invention is now claimed to be:

1. A wind turbine blade assembly, comprising:
a central shaft defining an axis of rotation;
a plurality of helically twisted blades supported on said central shaft, said helically twisted blades having an inner edge, an outer edge, and an upwind edge, wherein at least a portion of said helically twisted blades is radially spaced apart from said central shaft;
each of said helically twisted blades supported on one or more spokes extending from said central shaft, wherein said upwind edge connects with one of said one or more spokes; and
said one or more spokes inclined with respect to a transverse plane extending perpendicular to the axis of rotation toward an upwind end of said wind turbine blade assembly.

2. The wind turbine blade assembly of claim 1, wherein said plurality of helically twisted blades is selected from:
two blades angularly spaced apart 180 degrees;
three blades angularly spaced apart 120 degrees; and
four blades angularly spaced apart 90 degrees.

3. The wind turbine blade assembly of claim 1, wherein each of said helically twisted blades is formed from a generally circular strip of sheet material.

4. The wind turbine blade assembly of claim 3, wherein said generally circular strip of sheet material is selected from a strip having a uniform radial thickness and a strip having a tapered radial thickness.

5. The wind turbine blade assembly of claim 3, wherein said generally circular strip of sheet material has an inner radius and an outer radius and wherein the inner radius is approximately equal to one half of the outer radius.

6. The wind turbine blade assembly of claim 5, wherein a distance between the axis of rotation and the inner edge is equal to about one third of a distance between the axis of rotation and the outer edge.

7. The wind turbine blade assembly of claim 1, wherein each of said helically twisted blades is formed from strip of sheet material forming a partial circle.

8. The wind turbine blade assembly of claim 7, wherein each of said helically twisted blades is formed from a strip of sheet material forming a partial circle selected from a half circle, a third of a circle, and a quarter circle.

9. A wind turbine apparatus, comprising:
a wind turbine blade assembly including a central shaft defining an axis of rotation and a first plurality of helically twisted blades supported on said central shaft, each of said first plurality of helically twisted blades having an inner edge, an outer edge, and an upwind edge, wherein at least a portion of each of said first plurality of helically twisted blades is radially spaced apart from said central shaft;
a support member for rotatably supporting said wind turbine blade assembly;

each of said helically twisted blades supported on one or more spokes extending from said central shaft, wherein said upwind edge connects with one of said one or more spokes; and said one or more spokes inclined with respect to a plane extending perpendicular to the axis of rotation toward an upwind end of said wind turbine blade assembly.

10. The wind turbine apparatus of claim 9, further comprising:

said support member including a vertical leg and a horizontal arm attached to said vertical leg;

said horizontal arm rotatably supporting said central shaft.

11. The wind turbine apparatus of claim 10, further comprising:

said vertical leg is positioned on an upwind end of said first plurality of helical blades.

12. The wind turbine apparatus of claim 10, further comprising:

said vertical leg is positioned on a downwind end of said first plurality of helical blades; and means for aligning said wind turbine blade assembly with a wind direction.

13. The wind turbine apparatus of claim 9, further comprising:

a second plurality of helically twisted blades supported on said central shaft, each of said second plurality of helically twisted blades having an inner edge and an outer edge, wherein at least a portion of each of said second plurality of helically twisted blades is radially spaced apart from said central shaft.

14. The wind turbine apparatus of claim 13, further comprising:

said support member including a vertical leg and a horizontal arm attached to said vertical leg;

said horizontal arm rotatably supporting said central shaft; and said first plurality of helical blades and said second plurality of helical blades being disposed on opposite sides of said vertical leg.

15. The wind turbine apparatus of claim 9, further comprising:

a mechanical output coupled to said central shaft for generating mechanical power from rotation of said blade assembly.

16. The wind turbine apparatus of claim 9, further comprising:

an electrical output coupled to said central shaft for generating electrical power from rotation of said blade assembly.

17. The wind turbine apparatus of claim 9, further comprising:

each of said helically twisted blades is formed from a generally circular or partial circular strip of flat sheet material having an inner radius and an outer radius, wherein the inner radius is approximately equal to one half of the outer radius; and when assembled, each of said helically twisted blades is offset from the central shaft such that a distance between the axis of rotation and the inner edge is equal to about one third of a distance between the axis of rotation and the outer edge.

18. A wind turbine apparatus, comprising:

a wind turbine blade assembly including a central shaft defining an axis of rotation and a plurality of helically twisted blades supported on said central shaft, each of said helically twisted blades having an inner edge, an outer edge, and an upwind edge, wherein at least a portion of each of said helically twisted blades is radially spaced apart from said central shaft;

each of said helically twisted blades supported on one or more spokes extending from the central shaft, wherein said upwind edge connects with one of said one or more spokes;

a support member for rotatably supporting said wind turbine blade assembly;

said support member including a vertical leg and a cantilevered horizontal arm attached to said vertical leg;

said cantilevered horizontal arm rotatably supporting said central shaft; and said vertical leg positioned on one of:
an upwind end of said plurality of helical blades; and
a downwind end of said plurality of helical blades.

19. The wind turbine apparatus of claim 18, wherein said vertical leg is positioned on a downwind end of said plurality of helical blades, said wind turbine apparatus further comprising means for aligning the wind turbine blade assembly with a wind direction.

20. A wind turbine apparatus, comprising:

a wind turbine blade assembly including a central shaft defining an axis of rotation and a plurality of helically twisted blades supported on said central shaft, each of said helically twisted blades having an inner edge, an outer edge, and an upwind edge, wherein at least a portion of each of said helically twisted blades is radially spaced apart from said central shaft;

a support member for rotatably supporting said wind turbine blade assembly, said support member including a vertical leg and a horizontal arm attached to said vertical leg, said horizontal arm rotatably supporting said central shaft, said wind turbine blade assembly rotatable about a vertical axis of said vertical leg;

each of said helically twisted blades supported on one or more spokes extending from said central shaft, wherein said upwind edge connects with one of said one or more spokes;

said one or more spokes inclined with respect to a plane extending perpendicular to the axis of rotation toward an upwind end of said wind turbine blade assembly; and one or both of:
means for preventing free rotation of said wind turbine blade assembly rotatable about the vertical axis of said vertical leg; and means for returning said wind turbine blade assembly to an initial orientation relative to the vertical axis of the vertical leg.

* * * * *